March 5, 1974  E. C. A. SCHWARZ  3,795,720
METHOD OF PRODUCING A LOW DENSITY COMPOSITE SHEET MATERIAL
Original Filed Dec. 31, 1969
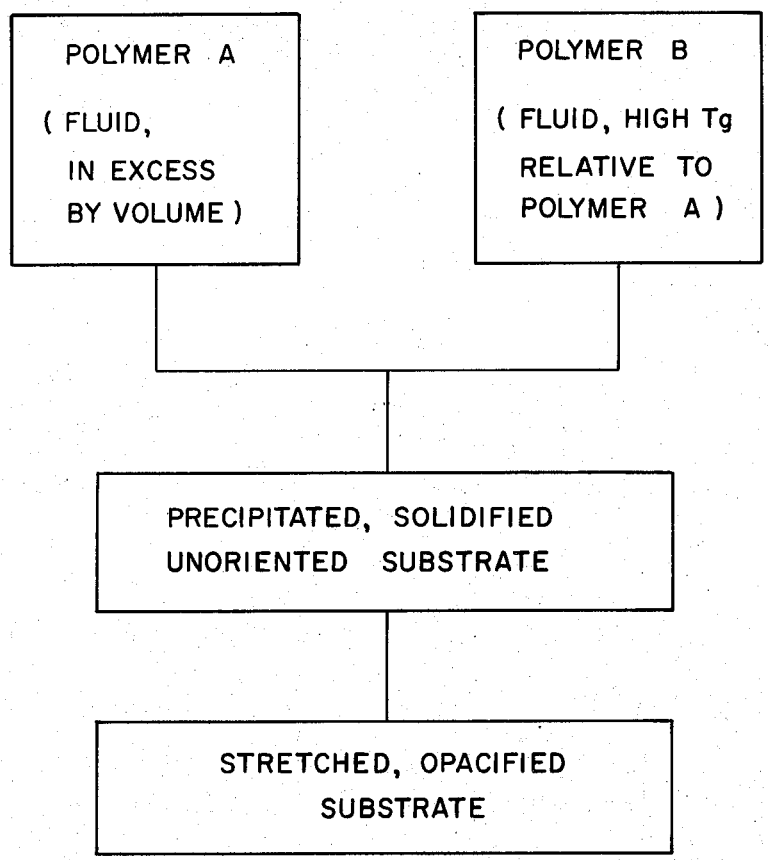
FIG. 1
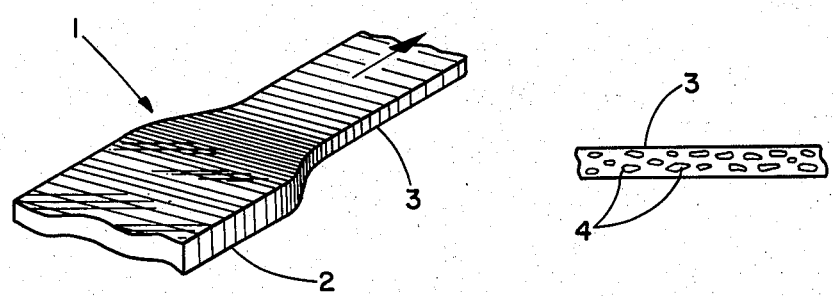
FIG. 2
FIG. 3

United States Patent Office 3,795,720
Patented Mar. 5, 1974

3,795,720
METHOD OF PRODUCING A LOW DENSITY
COMPOSITE SHEET MATERIAL
Eckhard C. A. Schwarz, Neenah, Wis., assignor to
Kimberly-Clark Corporation, Neenah, Wis.
Original application Dec. 31, 1969, Ser. No. 889,481.
Divided and this application Mar. 17, 1972, Ser.
No. 235,538
Int. Cl. B29h 7/20
U.S. Cl. 264—41     4 Claims

ABSTRACT OF THE DISCLOSURE

An opaque microporous film suitable as paper and capable of being printed. The film has at least two polymers which are incompatible with each other and one polymer which is in excess has a glass transition temperature at least 40° C. lower than that of another polymer with which it is incompatible. Drawing at about the glass transition temperature of the polymer in excess results in film opacity.

---

This is a division, of application Ser. No. 889,481 filed Dec. 31, 1969, now Pat. No. 3,697,367.

BACKGROUND OF THE INVENTION

Field of the invention

This invention relates to opaque, low density, microporous thermoplastic resin substrates useful, for example, in film form as a substitute for paper. The substrate may also be in fiber form and useful for a variety of conventional purposes including the making of a paper sheet from the fibers.

The invention with relation to the prior art

The invention, though useful in the production of fibers, will be described in specific aspect for convenience particularly in connection with opaque films, which are of about paper thickness. The literature records a plurality of methods directed to attaining paper-like materials as a substitute for the usual cellulosic paper sheets. These methods have included (1) forming synthetic resin filaments or fibers into thin sheets by entanglement of the fibers in water laying procedures similar to conventional papermaking techniques; (2) the extruding of foamable styrene into thin foam sheets having relatively large voids; (3) the extruding or calendering of pigment containing or filler containing resins; and (4) the use in synthetic films of foam generating substances (to develop surface roughness) in combination with soluble leachable materials (to develop upon leaching opacity-contributing voids).

These and other methods have suffered from a number of drawbacks including, particularly, difficulties in (a) preparing sufficiently thin sheets; (b) preparing surfaces which are receptive to printing including pen and pencil applications; and (c) preparing sheets of uniform and satisfactory physical properties such as flexibility, tensil, ink absorbency and the like in an economical manner.

I have found that many of the problems associated with prior art methods and products may be obviated by an appropriate selection of components for substrate formation and the treatment under particular conditions to develop a desired opaque microporous substrate. More in detail, I first select incompatible polymer components which, in the fluid state, are nonreactive and form a homogeneous fluid mixture but which, in the solid state, provide separate phases in the product. In selecting the polymers I provide one polymer which has at least about a 40° C. lower glass transition temperature (Tg) relative to another polymer of the mixture, and I provide this polymer of lower Tg in excess by volume, that is, to the extent of at least just more than 50% and preferably 60 to 98%. (The proportions of polymers as measured by weight and by volume are usually very nearly the same numerically and, accordingly, weight relationships, for convenience, are used in the specific examples herein). In my process two such polymers are mixed either in a common solvent or by solution in each other; upon solidification the polymer present in excess and of significantly lower glass transition temperature defines a continuous phase in the substrate. The second polymer, depending upon the specific nature of the system, forms a second phase which may be a continuous network extending through the first phase or, as is more common, the second phase is dispersed as small spheres throughout the body of the first and continuous phase. The polymers are incompatible and this term as used herein and in the appended claims will be understood to mean the polymers form two distinct phases which are not necessarily visible to the unaided eye but will show on a differential thermal analysis. Further, the polymers need not be incompatible over the entire temperature spectrum but only at ambient temperature or the temperature of drawing.

Such solidified mixture in film form, as described, lacks both suitable optical and physical properties for use as paper. It is transparent or highly translucent, lacking in strength and flex life. The phases are indistinguishable to the unaided eye. I have found, however, that such a polymer combination, when stretched at a temperature at least 40° C. below the higher Tg or approximating that of the glass transition temperature of the polymer in excess, not only becomes oriented, providing improved physical properties, but voids develop about and in the polymer component present in minor amount by volume. Such apparently results from a differential stretch effect in the two polymers, voids of elongated nature being formed adjacent polymer interfaces. In any event, the cold drawing of a film composed of polymers as described to about three times to ten times its original length, results in both a controlled crazing in the film and a reduction in specific weight of the film structure by a very considerable amount. Such reduction in specific weight indicates the formation of a very considerable void volume and such volume preferably is at least 10% of the final film volume. Visually, the film changes from the transparent or translucent to opaque. Microscopic examination of such a film shows the development of pores or voids of a generally needle shape separated on a submicroscopic scale and usually having a major dimension of about one micron.

I have found it to be particularly necessary to adequate void volume development that the Tg of the polymer present in excess be materially less, at least about 40° C. less than that of the other polymer. Otherwise, sufficient opacity does not develop in the substrate and it remains translucent. The specific nature of the porous film, that is, whether the pores are open or closed, does not appear to be material to the product of invention.

As thermoplastic resin mixtures suitable and conveniently usable in the practice of the invention, the following are exemplary:

| Polymer mixture: | Tg Differential ° C. |
|---|---|
| Polyethylene and polystyrene | 170 |
| Polyvinyl acetate and polyvinyl chloride | 45 |
| Polyvinyl acetate and polymethyl methacrylate | 75 |
| Polystyrene and polyacrylonitrile | 40 |
| Polybutyleneterephthalate and polymethyl methacrylate | 60 |
| Polypropylene and polystyrene | 75 |

It is vital in the practice of this invention to the development of opacity in such polymer composites that the extruded or otherwise formed substrate be drawn to secure appropriate molecular orientation and void development.

The invention will be more fully understood by reference to the following detailed description including the specific examples and the accompanying drawings wherein:

FIG. 1 is a flow chart illustrating primary steps in the procedure of the invention;

FIG. 2 is a fragmentary and perspective view of a film showing a drawn zone, an undrawn zone and a necked down area between such zones; and FIG. 3 is a sectional view taken in the direction transverse to the arrow in FIG. 2 and illustrating the void development within the film.

Referring first to FIGS. 2 and 3 of the drawings, the numeral 1 designates generally a solidified film produced in accordance with the practice of the invention. The film as shown in FIG. 2 has a first zone designated by the numeral 2 which is transparent or, in some instances, translucent. In any event the film is clear, and light passes through it readily. In the illustration in FIG. 2 the film has been drawn at 3 to a thinner and more narrow structure. This drawing develops the somewhat elongated voids indicated more clearly at 4 in FIG. 3. The voids result from the fact that, as indicated by the flow chart in FIG. 1, two polymers are present in the film, one of which has a materially lower glass transition temperature than the other. The material of higher glass transition temperature does not yield, it appears, quite as readily to tensile stress as does the material of lower glass transition temperature. Consequently, the differential stretch results in a void volume or craze within the stretched material. The polymers are combined as illustrated in FIG. 1 of the drawings and as illustrated in the following specific examples.

EXAMPLE 1

80 parts by weight of isotactic polypropylene having a Tg of 25° C. are liquefied with 20 parts by weight of polystyrene having a Tg of 100° C. The volume relationship of the polypropylene and the polystyrene was about 4:1. The liquid mixture which formed a homogeneous medium at 275° C. was extruded at about 235° C. into a film of about 4 mil thickness and immediately quenched in a water bath at a temperature of about 20° C. The film emanating from the water bath was non-oriented and translucent. Additionally, it had a specific weight of 0.96 gram per cubic centimeter. The film was cold drawn (temperature about 25° C.) to about 6 times its original length. The film sheet became highly opaque and whitened and acquired a paperlike relatively stiff feel compared to the original somewhat flimsy film. The specific weight of the drawn film was about 0.70 gram per cubic centimeter. Thus, a void volume of about 37% in the drawn film is indicated. A microscopic examination of the voids indicated that they were of needle shape. In this instance the distribution of the polystyrene in the polypropylene was in the form of small droplets before orientation.

EXAMPLE 2

90 parts by weight of isotactic polypropylene having a Tg of 25° C. were combined with 10 parts by weight of styreneacrylonitrile copolymer. The ratio of styrene to acrylonitrile was 7:3, and the Tg was about 105° C. The mixture was effected by heating the polymer components to about 275° C. and extruding the mixture as a film. Such film had a specific weight of about 0.95 gram per cubic centimeter and the film was clearly transparent. The film was then cold drawn (temperature about 25° C.) to about six times its original length. The film whitened and became highly opaque. The film specific weight was reduced to 0.71 g./cm.³ indicating a 25% void volume.

EXAMPLE 3

About 70 parts by weight of polyethylene having a Tg of —70° C. and 30 parts by weight of polystyrene having a Tg of 100° C. were formed into a homogeneous melt and extruded into film form. The extrusion was at a temperature of about 220° C. The film was then drawn at a temperature about 25° C. and the effect of drawing was to change the translucent unoriented film to an opaque whitish drawn film of good physical properties.

EXAMPLE 4

Example 3 was repeated except that the polyethylene was present to the extent of 95 parts by weight and the polystyrene to the extent of 5 parts by weight. The results differed from Example 3 in that slightly less opacity developed upon orienting the film.

EXAMPLE 5

About 70 parts of polyvinyl acetate having a Tg of 30° C. and 30 parts of polyvinyl chloride having a Tg of 75° C. were dissolved in a solvent solution containing tetrahydrofuran and methylene chloride. The tetrahydrofuran was present to the extent of 70% of the total solution weight. A film was formed from the solution of the polymers by casting on a flat surface. After evaporation of substantially all of the solvent, the solidified film was drawn at a temperature of about 25° C. The film in the solidified state was thoroughly translucent but became whitish and opaque with good physical properties upon drawing.

EXAMPLE 6

Example 5 was repeated but employing 95 parts by weight of polyvinyl acetate to 5 parts by weight of polyvinyl chloride. The product differed from the product of Example 5 in that slightly less opacity developed upon orienting.

EXAMPLE 7

About 70 parts by weight of polyvinyl acetate having a Tg of 30° C. were mixed with about 30 parts by weight of polymethyl methacrylate (Tg 105° C.) in a solution of acetone and methylene chloride. The acetone was present in the ratio of 7:3 to the methylene chloride. A film was formed by casting the solution on a flat surface and the solvent mixture evaporated. The solidified film was drawn at a temperature of about 25° C. and, upon drawing, changed from a translucent film to an opaque whitish film of good physical properties.

EXAMPLE 8

Example 7 was repeated but using 95 parts by weight of polyvinyl acetate to 5 parts of the polymethyl methacrylate. The drawn oriented film differed from that of Example 7 in that slightly less opacity developed upon orienting.

EXAMPLE 9

About 90 parts by weight of commercial polystyrene having a Tg of 100° C. was combined with 10 parts by weight of polyacrylonitrile having a Tg of 140° C. in hot dimethyl formamide as solvent. A film was formed by casting from the dimethyl formamide solution. The film was translucent in the solid state and was subjected to a drawing temperature of about 90° C., the film being drawn to about four times its original length. The product, upon drawing, developed good physical properties and became whitish in appearance and opaque.

EXAMPLE 10

About 70 parts by weight of poly-n-butyleneterephthalate having a Tg of 45° C. were mixed with about 30 parts by weight of polymethyl methacrylate having a Tg of 105° C. in a melt at a temperature of about 240° C. The melt was extruded at a temperature of about 22° C. to a film form and solidified. The solid film in the unoriented state was translucent and subtantially colorless. The film was then subjected to a drawing temperature of about 25° C. and drawn out to about four times its original length. The drawn oriented film was whitish and opaque.

EXAMPLE 11

Example 10 was repeated except that 98 parts by weight of the poly-n-butyleneterephthalate were employed to 2 parts by weight of the polymethyl methacrylate.

The foregoing examples clearly illustrate the effectiveness of the method of developing film opacity over a wide range of the components both as to their nature and as to their weight and volume proportions. It will be understood that basically the development of the desired opacity condition is dependent upon the combination of the incompatible polymers of widely differing Tg and drawing of the film at about the Tg of the polymer of lower Tg; it will also be appreciated that the polymers may exceed two in number if the condition of incompatible polymers of widely differing Tg exists.

As many apparently widely different embodiments of this invention may be made without departing from the spirit and scope thereof, it is to be understood that I do not limit myself to the specific embodiments thereof except as defined in the appended claims.

I claim:
1. A method of producing an opaque substrate which comprises mixing an excess by volume of a first thermoplastic polymer with a second thermoplastic polymer in the fluid state to form a homogenous fluid system, said first mentioned polymer having a glass transition temperature lower by at least 40° C. than that of the second polymer, the polymers being incompatible with each other at ambient temperatures, solidifying the mixture to insolubilize the polymers in each other and precipitate the polymers as separate phases of a substrate of which the first polymer forms a continuous phase, and cold drawing the substrate at a temperature at least 40° C. below the glass transition temperature of the second polymer to provide needle-shaped microscopic voids in the substrate and thereby opacify the substrate.

2. The method according to claim 1 in which the mixture is a solution of at least two polymers in a common solvent and the solidifying of the mixture is effected by evaporating off the solvent.

3. The method according to claim 1 in which the mixture consists of one fluid polymer dissolved in the other and solidifying of the mixture is effected by cooling.

4. The method according to claim 1 in which the first polymer is present to the extent by volume of between about 60% and 98%.

References Cited
UNITED STATES PATENTS

| | | | |
|---|---|---|---|
| 3,407,253 | 10/1968 | Yoshimura et al. | 264—289 |
| 3,154,461 | 10/1964 | Johnson | 161—116 |
| 3,697,367 | 10/1972 | Schwarz | 161—168 |

DONALD E. CZAJA, Primary Examiner

M. I. MARQUIS, Assistant Examiner

U.S. Cl. X.R.

260—2.5 HA, HB; 264—349